(12) United States Patent
Kunimatsu

(10) Patent No.: US 10,791,580 B2
(45) Date of Patent: Sep. 29, 2020

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Aran Kunimatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/257,596

(22) Filed: Jan. 25, 2019

(65) Prior Publication Data

US 2019/0239259 A1    Aug. 1, 2019

(30) Foreign Application Priority Data

Jan. 31, 2018    (JP) .................................. 2018-015506

(51) Int. Cl.
| | |
|---|---|
| *H04N 1/00* | (2006.01) |
| *H04W 76/10* | (2018.01) |
| *H04W 8/00* | (2009.01) |
| *G06F 3/12* | (2006.01) |
| *H04W 84/12* | (2009.01) |

(52) U.S. Cl.
CPC .......... *H04W 76/10* (2018.02); *G06F 3/1221* (2013.01); *G06F 3/1226* (2013.01); *G06F 3/1236* (2013.01); *G06F 3/1286* (2013.01); *G06F 3/1292* (2013.01); *H04W 8/005* (2013.01); *H04W 84/12* (2013.01)

(58) Field of Classification Search
CPC ..... H04W 76/10; H04W 8/005; H04W 84/12; G06F 3/1221; G06F 3/1286; G06F 3/1236

USPC ........................................................ 358/1.15
See application file for complete search history.

(56) References Cited

U.S. PATENT DOCUMENTS

| | | | |
|---|---|---|---|
| 7,317,712 B2 | 1/2008 | Ishimura | |
| 10,057,845 B2 | 8/2018 | Saeki et al. | |
| 2006/0039336 A1 | 2/2006 | Ishimura | |
| 2016/0360477 A1 | 12/2016 | Saeki et al. | |
| 2017/0026995 A1* | 1/2017 | Huang | H04W 72/1278 |
| 2018/0035363 A1* | 2/2018 | Gupta | H04W 48/16 |
| 2018/0332547 A1* | 11/2018 | Liu | H04W 56/001 |

FOREIGN PATENT DOCUMENTS

| | | |
|---|---|---|
| JP | 2006060578 A | 3/2006 |
| JP | 2015200989 A | 11/2015 |

\* cited by examiner

*Primary Examiner* — Saeid Ebrahimi Dehkordy
(74) *Attorney, Agent, or Firm* — Venable LLP

(57) ABSTRACT

A communication apparatus that performs first wireless communication in accordance with a Neighbor Awareness Network (NAN) and second wireless communication using a communication circuit common with the first wireless communication is provided. The communication apparatus performs the first wireless communication so as to transmit identification information of the communication apparatus as a predetermined transmission in response to a start of the first wireless communication, and to advertise a service providable by the communication apparatus in response to a response from a terminal apparatus with respect to the predetermined transmission. The communication apparatus performs the second wireless communication to provide the service with the terminal apparatus which has detected the service by advertisement of the service using the first wireless communication.

26 Claims, 11 Drawing Sheets

| Transmitter Address (TA) | Service Info |
|---|---|
| 01-23-45-67-89-AA | PRINTER NAME = "5TH-FLOOR OFFICE NORTH-SIDE PRINTER" — 601 |
| 01-23-45-67-89-BB | PRINTER NAME = "5TH-FLOOR OFFICE SOUTH-SIDE PRINTER" |
| 01-23-45-67-89-CC | PRINTER NAME = "5TH-FLOOR OFFICE EAST-SIDE PRINTER" |
| 01-23-45-67-89-DD | PRINTER NAME = "5TH-FLOOR OFFICE WEST-SIDE PRINTER" |

| Transmitter Address (TA) | Service Info |
|---|---|
| 01-23-45-67-89-XX | DATA TYPE = "SERVICE LIST REQUEST" — 701 |

FIG. 8

| Transmitter Address (TA) | Service Info |
|---|---|
| 01-23-45-67-89-AA | DATA TYPE = "SERVICE LIST RESPONSE"<br>SERVICE LIST = "PRINT SERVICE", "SCAN SERVICE" |
| 01-23-45-67-89-BB | DATA TYPE = "SERVICE LIST RESPONSE"<br>SERVICE LIST = "PRINT SERVICE", "SCAN SERVICE", "STORAGE SERVICE" |
| 01-23-45-67-89-CC | DATA TYPE = "SERVICE LIST RESPONSE"<br>SERVICE LIST = "SCAN SERVICE" |
| 01-23-45-67-89-DD | DATA TYPE = "SERVICE LIST RESPONSE"<br>SERVICE LIST = "PRINT SERVICE", "SCAN SERVICE" |

FIG. 9

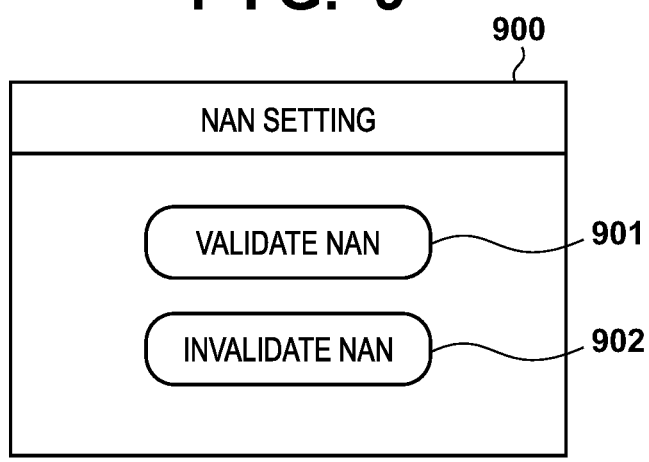

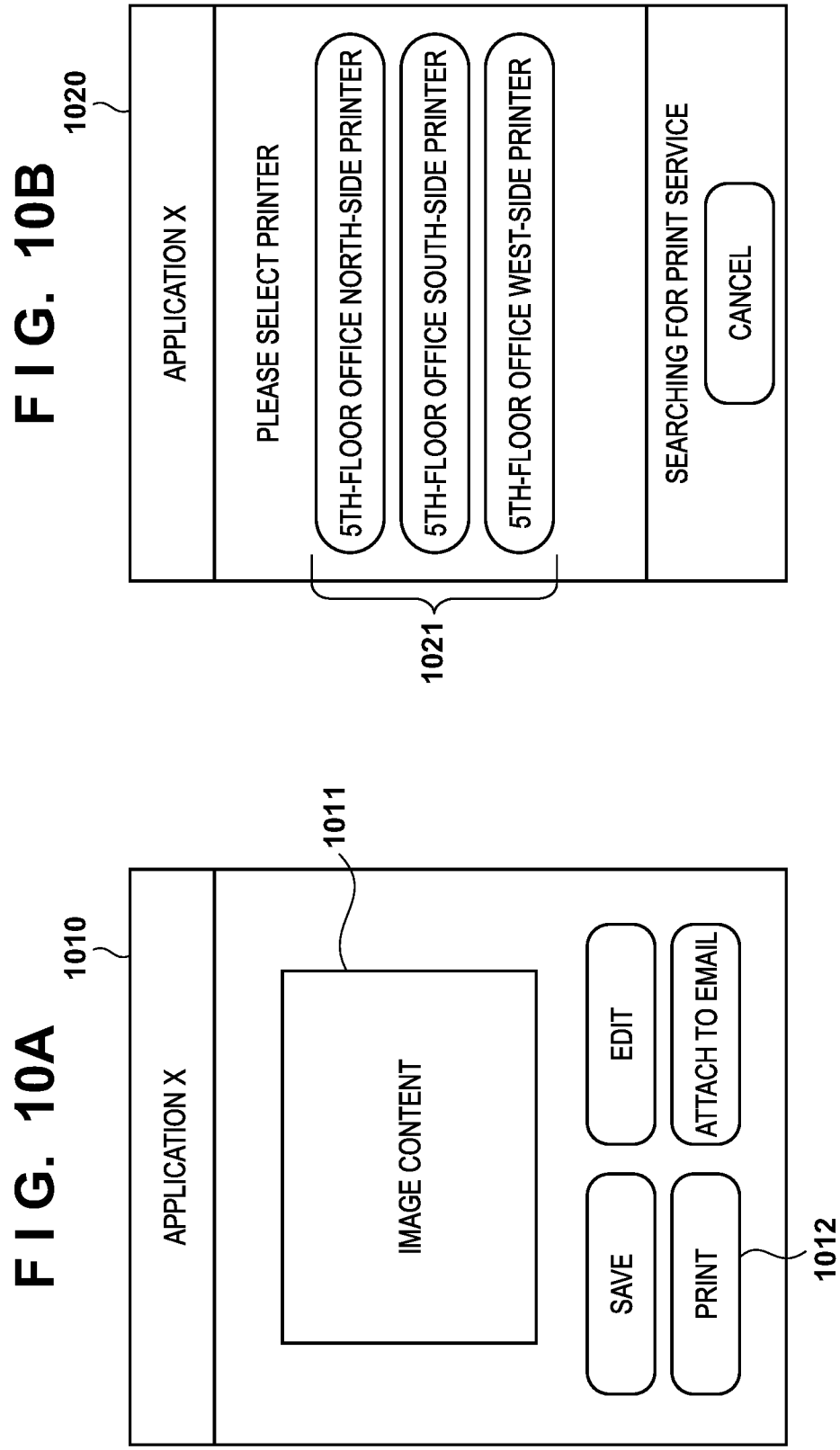

FIG. 10C

APPLICATION X

CONNECTED TO
"5TH-FLOOR OFFICE NORTH-SIDE PRINTER".
CURRENTLY PRINTING...

APPLICATION X

PRINTING COMPLETED.

1040

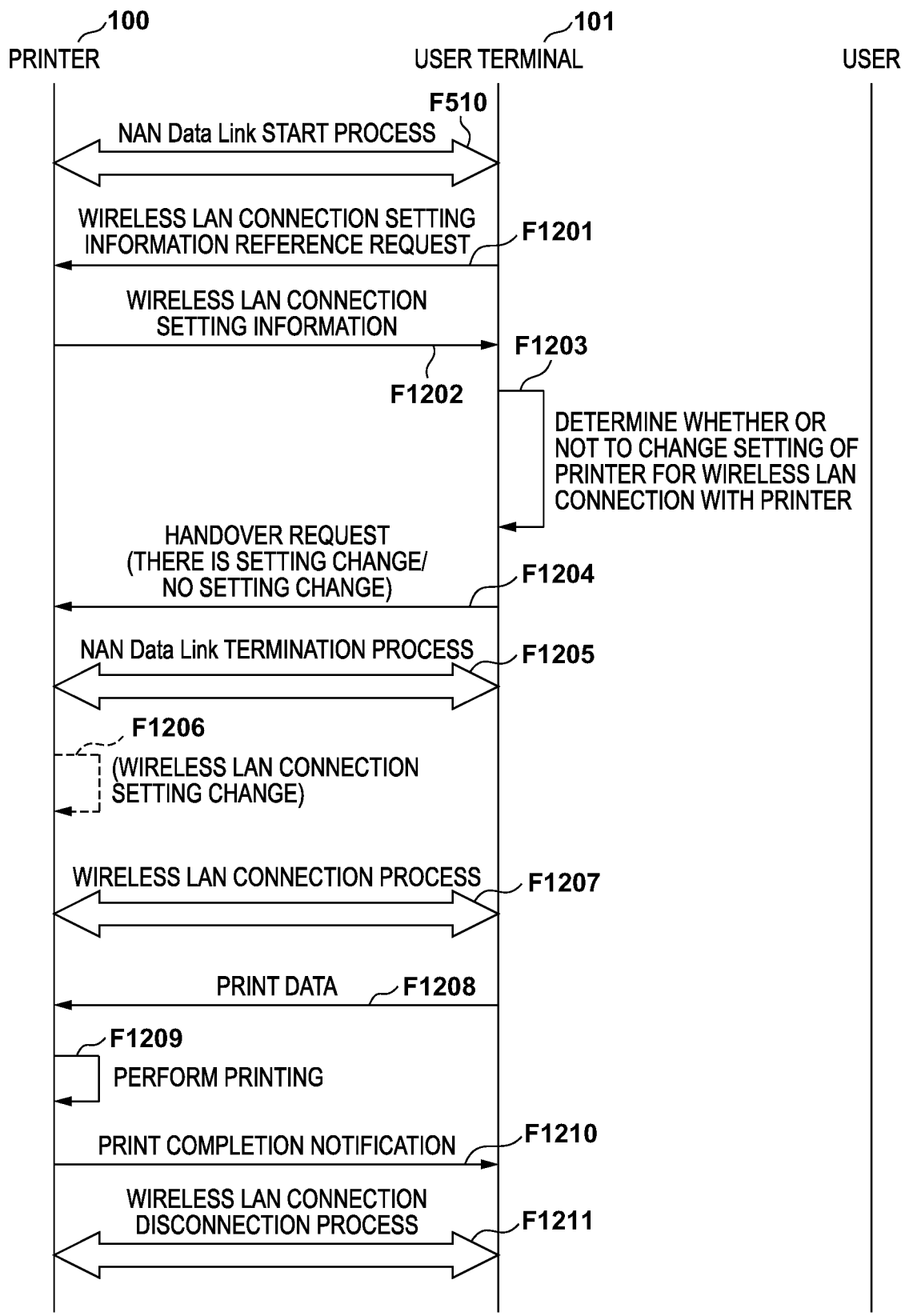

COMMUNICATION APPARATUS, COMMUNICATION METHOD, AND NON-TRANSITORY COMPUTER-READABLE STORAGE MEDIUM

BACKGROUND OF THE INVENTION

Field of the Invention

The present invention relates to a wireless connection establishment control technique.

Description of the Related Art

A communication function using a wireless LAN complying with the IEEE802.11 standard series is widely used to provide a service by a printer and the like. Japanese Patent Laid-Open No. 2006-060578 describes a technique of securely establishing a wireless LAN connection between a printer and a user terminal and transferring print data using the established connection. Japanese Patent Laid-Open No. 2015-200989 describes a technique of detecting, using Bluetooth® Low Energy (BLE), a printer capable of a wireless LAN connection and establishing a wireless LAN connection with the detected printer. According to the technique described in Japanese Patent Laid-Open No. 2015-200989, since a connectable printer is detected using BLE with low power consumption before establishing a wireless LAN connection, the power consumption until establishing the connection can be suppressed.

In the method described in Japanese Patent Laid-Open No. 2015-200989, each of two apparatuses that communicate with each other need to have a wireless LAN communication function and a BLE communication function. However, the signal format and packet structure in a physical layer are different in BLE and a wireless LAN. Therefore, in the method described in Japanese Patent Laid-Open No. 2015-200989, each apparatus needs to have two separate communication circuits, resulting in an increase in component cost.

SUMMARY OF THE INVENTION

The present invention provides a technique that realizes establishment of a wireless connection between apparatuses while suppressing the apparatus cost with low power consumption.

According to one aspect of the present invention, there is provided a communication apparatus that performs first wireless communication in accordance with a Neighbor Awareness Network (NAN) and second wireless communication using a communication circuit common with the first wireless communication, comprising: at least one processor, wherein the at least one processor performs the first wireless communication so as to transmit identification information of the communication apparatus as a predetermined transmission in response to a start of the first wireless communication, and to advertise a service providable by the communication apparatus in response to a response from a terminal apparatus with respect to the predetermined transmission, and performs the second wireless communication to provide the service with the terminal apparatus which has detected the service by advertisement of the service using the first wireless communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a view showing examples of data included in a publish message transmitted by the printer;

FIG. 7 is a view showing an example of data included in a follow-up message transmitted by a user terminal;

FIG. 8 is a view showing examples of data included in a follow-up message transmitted by the printer;

FIG. 9 is a view showing an example of a screen for setting validation/invalidation of NAN in the printer;

FIGS. 10A to 10D are views showing examples of screens of an application on the user terminal;

FIG. 12 is a sequence chart showing the second example of the procedure of processing performed in the wireless communication system.

DESCRIPTION OF THE EMBODIMENTS

Figure 1:
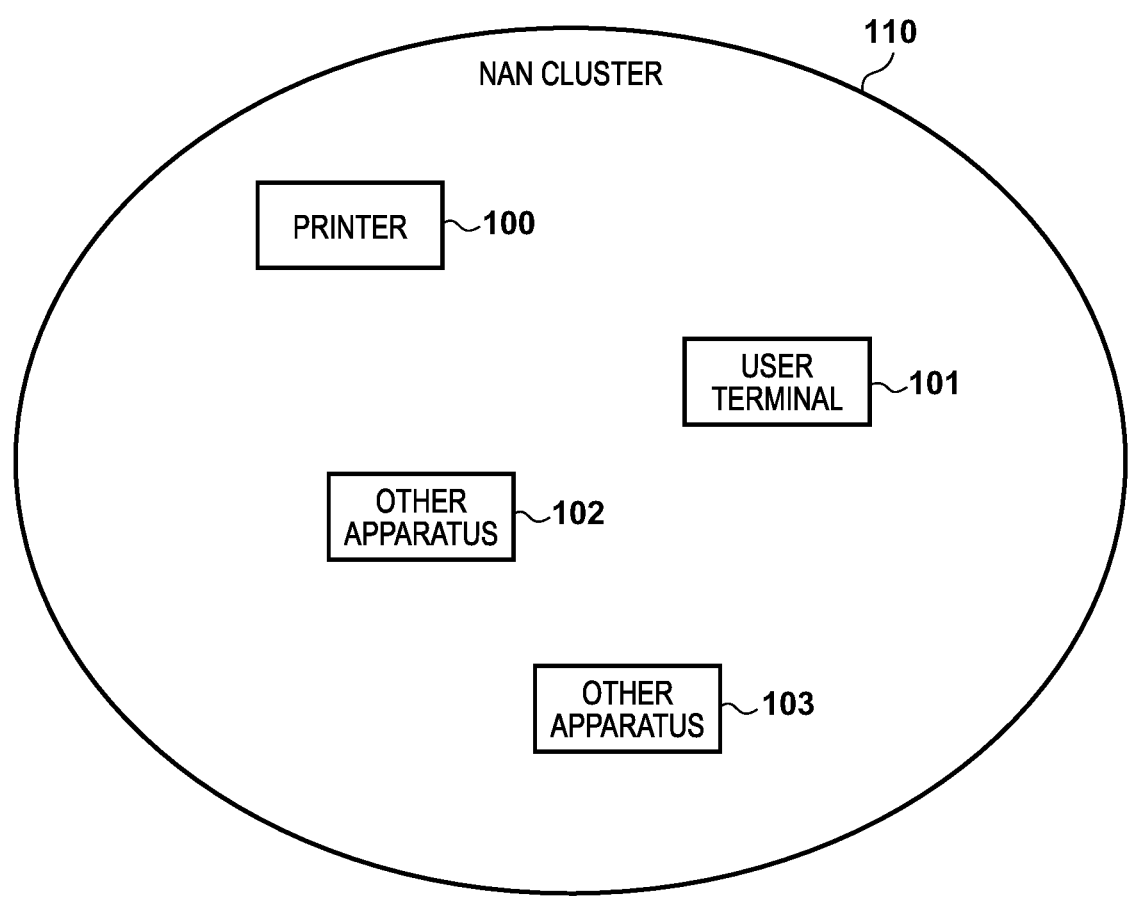
FIG. 1 is a view showing an example of the configuration of a wireless communication system.

An exemplary embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

In an embodiment described below, it is assumed that a printer has a wireless LAN communication function complying with the IEEE802.11 standard series, and performs wireless communication with a user terminal by using the communication function. The printer sends a signal for advertising a print service provided by the printer, in accordance with the Neighbor Awareness Network (NAN) standard of Wi-Fi Alliance. Other apparatuses such as a user terminal in the vicinity of the printer receive the signal, thereby recognizing that the printer is providing the print service. The printer uses wireless LAN communication based on communication in accordance with the NAN standard to perform communication with the user terminal to execute a service such as a transmission/reception of print data. In the NAN standard, a period called discover window (DW) is defined as a communication period for advertising and searching for a service. A DW is a period with a predetermined short period length and set in every predetermined cycle. For example, a DW is set as a period of 16 TUs repeatedly in every 512 TUs. Note that "TU" is an acronym for Time Unit, and 1 TU corresponds to 1,024 μsec. A set of one or more communication apparatuses which share the schedule of DWs is called a NAN cluster. The communication apparatus belonging to one NAN cluster synchronizes with the schedule of DWs shared in the NAN cluster, and performs communication for advertising and searching for a service. Note that since a communication apparatus that advertises and searches for a service in accordance with the NAN standard can enter a doze state outside a DW period, in which no wireless signal is transmitted/received, the power consumption can be suppressed. In this embodiment, communication of data to be used when the printer performs a print service is performed in a NAN data link, in which data is transmitted/received outside a DW period. In a NAN data link, relatively high-speed and secure wireless LAN communication can be performed, and the same communication circuit as advertising and searching for a service by NAN can be used. That is, comparing to a case in which a communication method such as BLE that cannot use the common communication circuit is used, the cost of a communication apparatus can be suppressed. Note that for the details of the NAN standard, refer to Neighbor Awareness Networking Technical Specification v2.0, which is defined by Wi-Fi Alliance.

First, the configuration of a system and the arrangement of an apparatus will be described below, and then some examples of the procedure of processing will be described.

<System Configuration>

FIG. 1 is a view showing an example of the configuration of a wireless communication system according to this embodiment. This wireless communication system includes, for example, a printer 100, a user terminal 101, and other apparatuses 102 and 103. Each of these apparatuses is considered to be a communication apparatus that complies with the IEEE802.11 standard series, and has a NAN communication function with low power consumption and a wireless LAN communication function with relatively high power consumption. Note that in this embodiment, a case in which each apparatus has a wireless communication function complying with the IEEE802.11 standard series will be described. However, the apparatus may have a wireless communication function complying with another wireless communication standard. That is, the following description is applicable to a case in which a communication apparatus supports a plurality of wireless communication methods using common wireless communication hardware (communication circuit), and at least one of the plurality of wireless communication methods has the power consumption lower than that of the other wireless communication method.

The printer 100 can provide one or more services to the other apparatus such as the user terminal 101. For example, in response to a print request from the other apparatus connected through a wireless network, the printer 100 can provide a print service for it. In addition, the printer 100 can provide a service other than a print service such as a scan service. Note that although an example in which the printer 100 is used will be described in this embodiment, the present invention is not limited to this. That is, the printer 100 according to this embodiment can be replaced with an arbitrary service providing apparatus that provides a service other than a print service, such as a projector which performs a display service of video data using wireless communication.

The user terminal 101 is a battery-powered mobile device that has a user interface including, for example, a liquid crystal screen and touch panel. However, the present invention is not limited to this. As the user terminal 101, any type of apparatus with a communication function can be used, such as a portable or stationary apparatus connected to the main power supply or powered by a battery. The user terminal 101 can be any one of, for example, a smartphone, a cellular phone, a tablet PC (Personal Computer), a laptop PC, a note PC, and a portable game machine. In this embodiment, the user terminal 101 has a function of searching for a nearby printer that provides a print service and transmitting content data such as an image to the detected printer, thereby causing it to print the data. Note that the user terminal 101 may have various functions for causing other apparatuses to perform various services. The function that the user terminal 101 has can be implemented when the software corresponding to a predetermined application is executed by hardware such as a processor on an OS (Operating System) running on the user terminal 101.

As described above, the printer 100 and the user terminal 101 perform communication for advertising and searching for a print service by using NAN with low power consumption, and perform communication of a signal for executing a service such as a print service by using a wireless LAN based on NAN, which has a relatively high speed and high power consumption. The communication in NAN between the printer 100 which advertises a service and the user terminal 101 which searches for a service is performed by bi-directional communication in a DW period using channel 6 (2.437 GHz) in a frequency band of 2.4 GHz. When the printer 100 and the user terminal 101 belong to the same NAN cluster 110, the printer 100 can communicate with the user terminal 101 in a DW period. Note that the other apparatuses 102 and 103 in FIG. 1 can belong to the same NAN cluster 110 as well.

Each apparatus belonging to the NAN cluster operates in one of master, non-master sync, and non-master non-sync roles. The apparatus operating in the master role transmits a synchronization beacon (sync beacon) as a beacon for enabling each apparatus to check the DW and synchronize with it. In addition, the apparatus operating in the master role transmits a discovery beacon as a signal for causing an apparatus, which does not belong to the NAN cluster, to recognize the NAN cluster. The discovery beacon is transmitted during a period other than the DW periods for, for example, every 100 ms. Note that at least one apparatus in each NAN cluster operates in the master role. The apparatus operating in the non-master sync role transmits not a discovery beacon but a sync beacon. The apparatus operating in the non-master non-sync role transmits neither a sync beacon nor a discovery beacon.

In this embodiment, the other apparatus 102 is assumed to operate in the master role in the NAN cluster 110. The printer 100 and the user terminal 101 recognize the NAN cluster 110 by receiving a discovery beacon from the other apparatus 102, and detect the DW period of the NAN cluster 110 by further receiving a sync beacon. Note that since it is permitted to change the apparatus operating in the master role in the NAN cluster, the printer 100 or the user terminal 101 may operate in the master role afterwards. In addition, the NAN cluster 110 may be formed when the printer 100 transmits a discovery beacon as a master, and the nearby user terminal 101 and the other apparatuses 102 and 103 receive the discovery beacon. Furthermore, the user terminal 101 may operate in the master role and the printer 100 and other apparatuses 102 and 103 may receive a discovery beacon transmitted by the user terminal 101, so that they may join the NAN cluster 110.

The printer 100 and the user terminal 101 transmit/receive a signal (message) for advertising and searching for a service in a DW period of the NAN cluster 110. First, the printer 100 transmits a publish message as a message for advertising a service in a DW period, thereby advertising that it is providing (can provide) a print service. On the other hand, the user terminal 101 can transmit a subscribe message as a message for searching for or requesting a service in a DW period, so that it can notify the printer 100 that it is searching for a printer. The printer 100 may, for example, transmit a publish message when it has received a subscribe message from the user terminal 101 and it can provide the service designated by the subscribe message. The printer 100 and the user terminal 101 can further transmit/receive additional information by a follow-up message. For example, the printer 100 can make a list of the service names being provided currently, and include and transmit it as a service list in a follow-up message. At least a part of the message complying with the NAN standard, such as a publish message, a subscribe message, and a follow-up message, are transmitted in the frame format called a service discovery frame (SDF).

Figure 2:
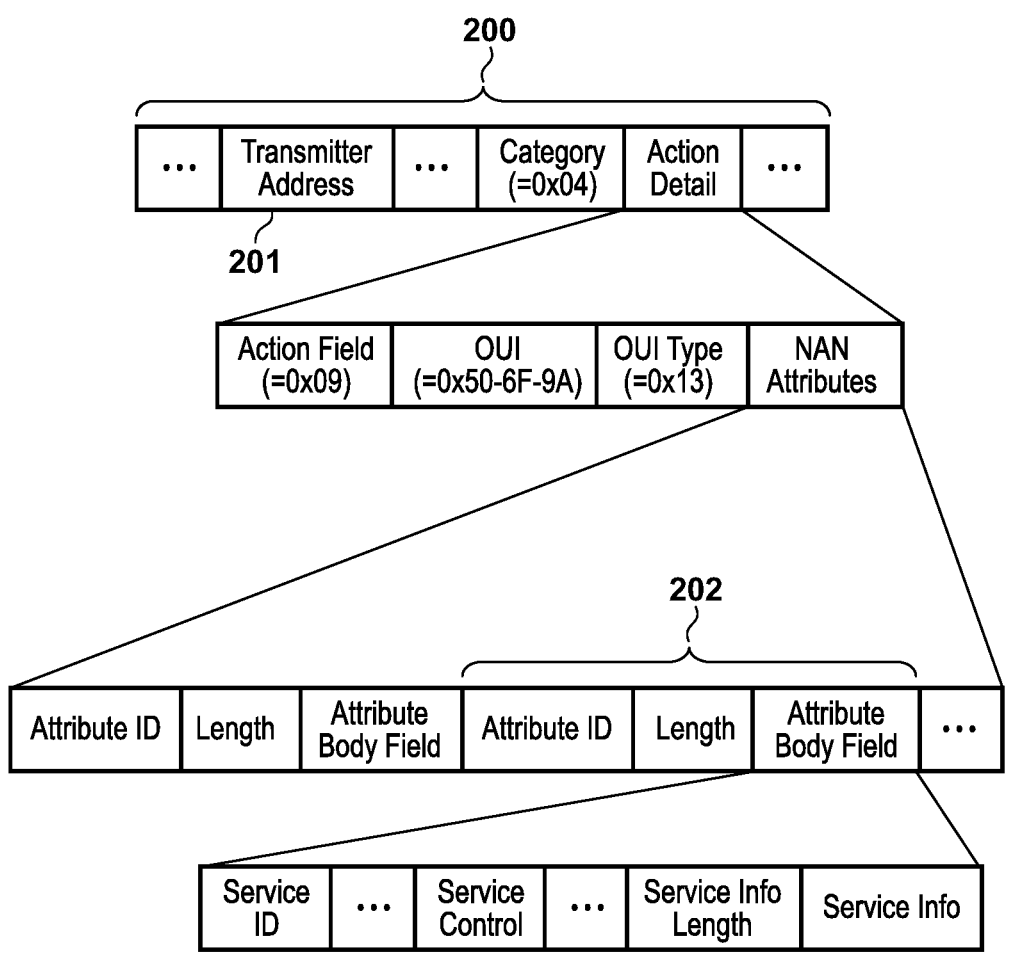
FIG. 2 is a view showing the structure of a service discovery frame (SDF)

FIG. 2 shows the frame structure of an SDF 200. The SDF 200 is a kind of the MAC frame defined by the IEEE802.11 standard series. The SDF 200 is formed to include a transmitter address 201, which is the address of a NAN device as the transmission source thereof, and one or more NAN attributes 202. Note that transmitter address will be referred to as a TA hereinafter. There are a plurality of types of NAN attributes. The type is defined by an attribute ID, and the contents of an attribute body field are defined for each type. When the value of the attribute ID is 0x03, the NAN attribute is called a service descriptor attribute. The attribute body field of a service descriptor attribute includes the respective fields of a service ID, service control, and service info. In the service ID field, identification information for identifying the apparatus or service, which represents the type of the apparatus such as a printer and the type of the service such as a print service, can be stored. In a Service Control field, information representing the message type such as publish, subscribe, and follow-up can be stored. A service info field is a field in which arbitrary information can be stored. In this embodiment, as will be described later, the printer name, information for identifying a service such as a service list which is a list of providable services, and information representing a predetermined request are included in the service info field. The NAN attribute other than the service descriptor attribute is also defined, and other pieces of information can be transmitted as needed.

A case in which the user terminal 101 receives a publish message indicating that the printer 100 is providing a print service and a follow-up message from the printer 100 in a DW period will be described. In this case, the user terminal 101 can establish a NAN data link in which data is transmitted/received between the user terminal 101 and the printer 100 at timing outside a DW period as needed. In the NAN data link, secure communication can be performed by executing an encryption process based on a pre-shared key. The printer 100 and the user terminal 101 use the NAN data link to transfer print data from the user terminal 101 to the printer 100.

Note that print data may not be transferred in the NAN Data link, but information required for establishing a wireless LAN connection different from NAN may be transmitted/received and the NAN data link may be switched to another wireless LAN connection. According to this, it becomes possible to provide a service by high-speed large-capacity communication compared to NAN. In this case, for example, one of the printer 100 and the user terminal 101 operates as an access point (AP) of the wireless LAN, and the other operates as a station (STA) of the wireless LAN so that they can establish the wireless LAN connection and perform communication. According to this, by not connecting to another AP to which another apparatus is connecting, high-speed communication can be performed. Note that both of the printer 100 and the user terminal 101 may operate as STAs and connect to an external AP to perform communication. Accordingly, a wireless LAN connection can be established by effectively utilizing existing facilities. In addition, the printer 100 and the user terminal 101 may execute a P2P connection (direct connection) based on a Wi-Fi Direct standard. This makes it possible to perform high-speed communication without permitting a connection by another apparatus. As described above, after discovering a connection partner in NAN, a handover from NAN to another wireless LAN connection for data communication may be performed and print data may be transferred from the user terminal 101 to the printer 100. At this time, by utilizing a wireless LAN communication function complying with the IEEE802.11 standard series, it is possible to share at least a part of the NAN communication function and its communication circuit, and an increase in cost can be suppressed.

<Arrangement of Printer>

Figure 3:
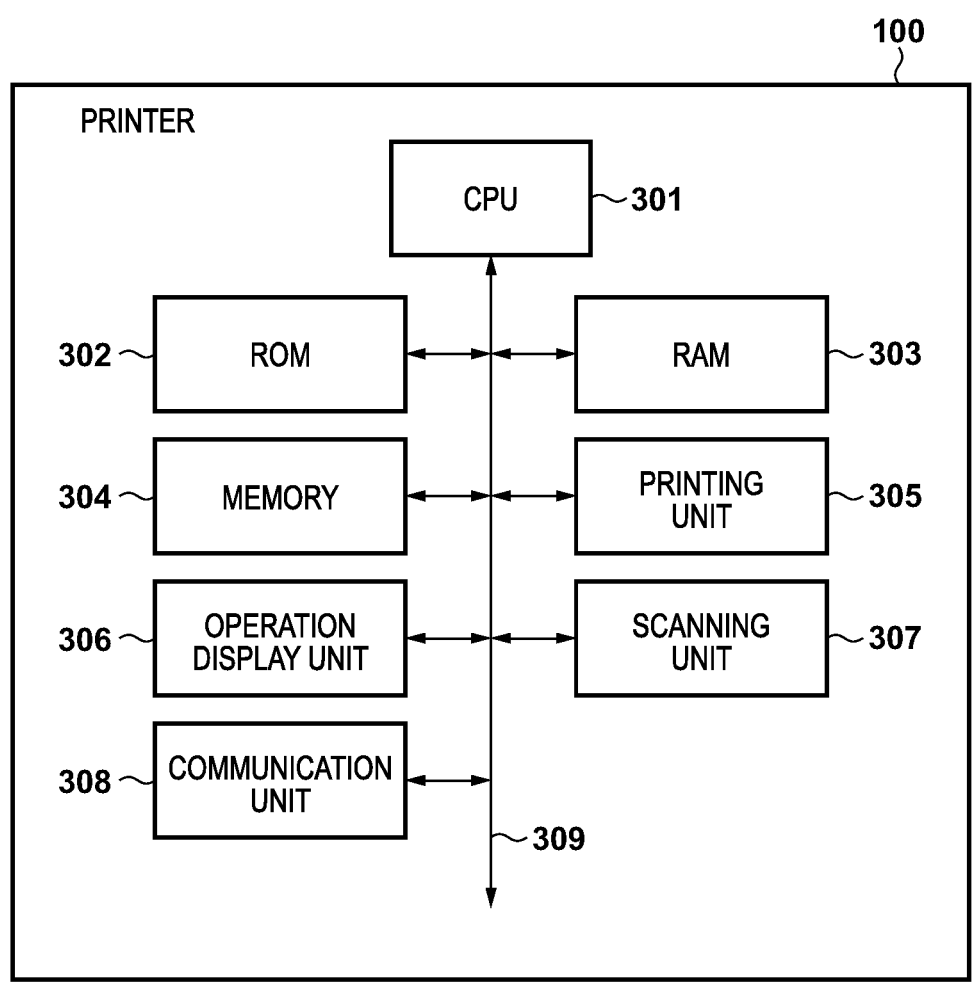
FIG. 3 is a block diagram showing an example of the arrangement of a printer.

An example of the arrangement of the printer 100 of this embodiment will be described with reference to FIG. 3. The printer 100 comprises, for example, a CPU 301, a ROM 302, a RAM 303, a memory 304, a printing unit 305, an operation display unit 306, a scanning unit 307, a communication unit 308, and a CPU bus 309. Note that the arrangement shown in FIG. 3 is an example, and the printer 100 may have a function other than those shown in FIG. 3, or may not have the function shown in FIG. 3. For example, the printer 100 can have an interface such as USB (Universal Serial Bus).

The CPU 301 controls the overall printer 100 in accordance with a program for basic control or the like written in the ROM 302. The ROM 302 stores the program for basic control and programs for various kinds of processing. The RAM 303 provides a work area used when the CPU 301 or the like executes the program read out from the ROM 302, and a storage area used as a buffer upon transmitting/receiving data. The memory 304 provides a storage area used for reading out and writing various setting values and data. The printing unit 305 includes a printhead and ink tanks for respective colors, and prints an image on a printing medium such as a print sheet by discharging ink in the ink tank through the printhead. The printer 100 can provide a print service by using the printing unit 305. The operation display unit 306 provides an operation reception function including character input keys, cursor keys, an enter key, a cancel key, and other input devices, and an information display function including a visual output function such as an LED (Light Emitting Diode) and an LCD (Liquid Crystal Display) and an audio output function such as a speaker. A user can activate and set the various functions of the printer 100 through the operation display unit 306. The operation display unit 306 may be formed from a touch panel which integrally performs operation acceptance and information display. The scanning unit 307 provides a function of scanning a document such as a paper text or film placed on a document table to generate image data. The scanning unit 307 includes a scanner head including a scanning sensor, which has a scanning width corresponding to the maximum width of a readable document sheet, and generates image data (scan data) by scanning an image while moving, for example, the scanner head. The printer 100 can provide a scan service by using the scanning unit 307. The communication unit 308 provides a wireless communication function by a wireless LAN complying with the IEEE802.11 standard series. The communication unit 308 is configured to perform communication by establishing a connection with one or more other apparatuses by using this wireless communication function. In addition, the communication unit 308 may have a connection function to a wired LAN such as Ethernet. The above-described components 301 to 308 included in the printer 100 are connected with each other via the CPU bus 309.

<Procedure of Processing>

Some examples of the procedure of processing performed in the above-described system configuration and apparatus arrangement will be described from the viewpoint of the printer 100 mainly. This processing is started in response to that the NAN function is validated in the printer 100 and a predetermined application is executed on the user terminal 101.

Processing Example 1

In this processing example, an example of the procedure of processing in which a service is advertised and searched for between the printer 100 and the user terminal 101, and then print data is transferred and a print service is performed will be described.

First, an example of the procedure of processing performed by the printer 100 will be described with reference to FIG. 4. The processing shown in FIG. 4 can be started in response to that the NAN function is validated in the printer 100. Note that the NAN function is validated in response to pressing of a NAN validation button 901 on a UI screen 900 of the operation display unit 306 of the printer 100 as shown in FIG. 9. In addition, the NAN function may be validated in response to power-on and a recovery operation from a sleep state of the printer 100, an input of a providing start instruction of a service such as a print service, and a reception of a predetermined operation such as the validation operation of another wireless LAN function which the printer 100 has. In this case, validating the NAN function can start the processing shown in FIG. 4. In this way, the processing shown in FIG. 4 is started in response to a predetermined operation by a user, so that it can be prevented that service information is unnecessarily advertised and unnecessary communication occurs.

Figure 4:
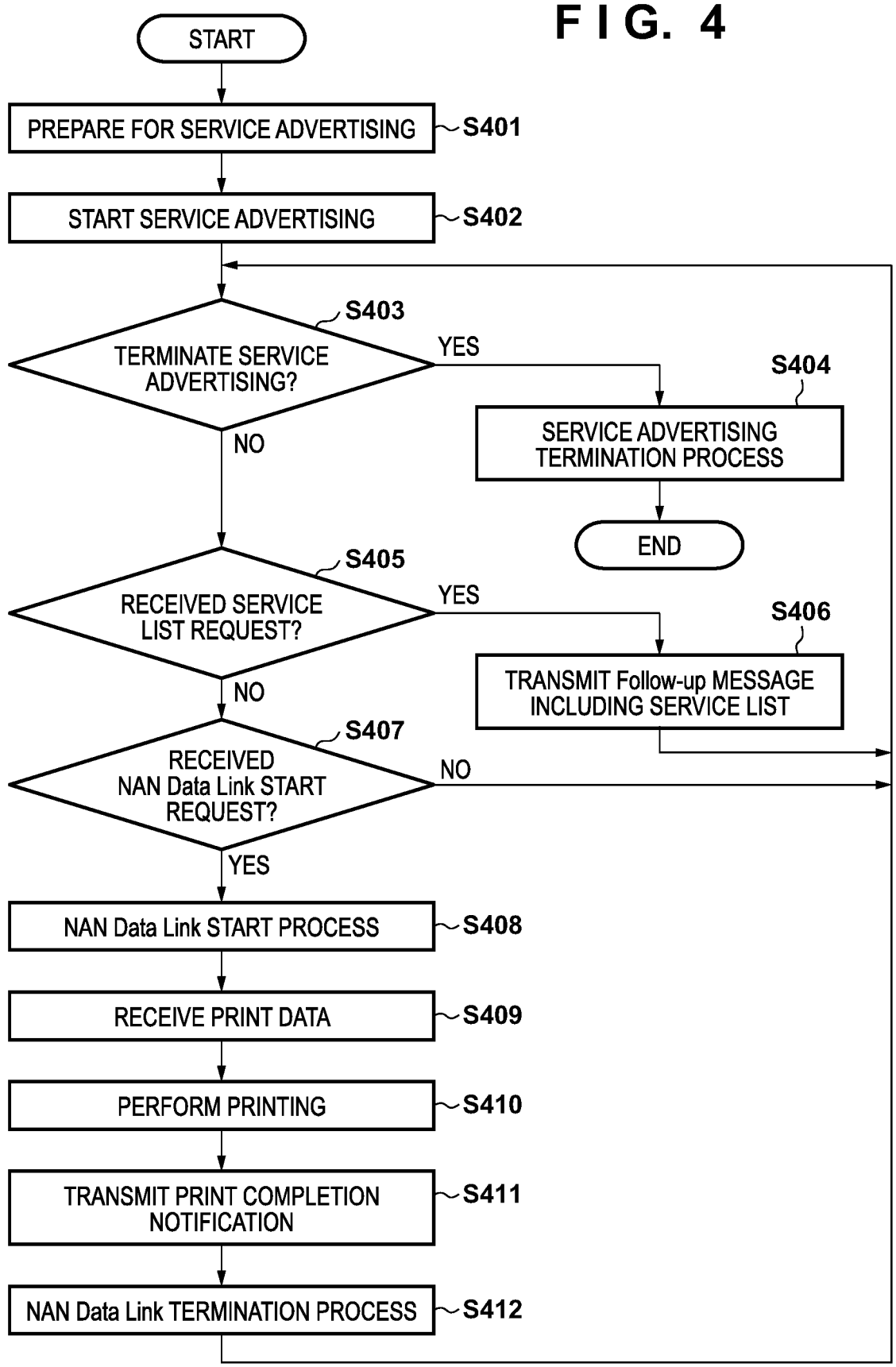
FIG. 4 is a flowchart illustrating the first example of the procedure of processing performed by the printer.

When the processing shown in FIG. 4 is started, the CPU 301 controls the communication unit 308 to prepare for advertising a service providable by the printer 100 (step S401). For example, the CPU 301 controls the communication unit 308 to join a NAN cluster and detect the DW period of the NAN cluster from a discovery beacon and a sync beacon. Subsequently, the CPU 301 reads out a character string, which is held in the ROM 302 in advance, representing the apparatus based on the manufacturer name and apparatus type of the printer 100. In an example, this character string is used as a character string called a service name in the NAN standard. This character string can be a character string such as "manufacturer_xxx.Printer", but the present invention is not limited to this, and a different character string may be used. For example, if the manufacturer name and apparatus type can be identified without the manufacturer name (for example, the part of "manufacturer") or the apparatus type (for example, the part of "Printer"), these pieces of information may be omitted. For example, the apparatus type can be omitted when it can be identified from the manufacturer name, and the manufacturer name can be omitted when it is enough to know the apparatus type. Then, the CPU 301 calculates a hash value about the character string. For example, the CPU 301 uses the character string as an input for a hash function SHA-256, and can use the first 48 bits (6 bytes) of the output result of the hash function as the hush value. Note that the hush value may be calculated by not the CPU 301 but another function of the communication unit 308 or the like. The calculation method of a hush value described above is an example, and a hush value may be calculated in another calculation method. In some cases, a predetermined value such as a character string itself, which corresponds to the character string but is not a hush value, may be used. In this way, when the value corresponding to the character string representing the apparatus based on the manufacturer name and apparatus type is designated in the service name, only a user terminal to which a corresponding application is installed can discover the printer 100. That is, when a user terminal to which a predetermined application is not installed searches for a service by designating a general service name such as "print service", this makes it possible to prevent unintentional discovery of the printer 100.

When the preparation for advertising the service is complete, the CPU 301 controls the communication unit 308 to start to advertise the service (step S402). For example, the CPU 301 controls the communication unit 308 to transmit a publish message in a DW period. The publish message in this case is a message in which a value identifying that this message is a publish message is set in the service control and a service ID matching with the hash value calculated in step S401 is set in the SDF shown in FIG. 2. In addition, information such as the printer name can be added to the service info included in the publish message. FIG. 6 shows examples of data included in the publish message transmitted in step S402. Table 600 shows data included in each publish message when each of four printers transmits a publish message, as an example, in which one row corresponds to the data transmitted by one printer. Note that Table 600 can be an aggregation of data obtained from four publish messages received from the four printers respectively by the user terminal. For example, data 601 indicates that the printer with the transmitter address (TA) "01-23-45-67-89 AA" transmits a publish message including information "printer name="5th-floor office north-side printer" in the service info. The CPU 301 monitors whether a trigger for terminating the advertising of the service is generated during continuing advertising the service (step S403). This trigger can be the pressing of a NAN invalidation button 902 on the UI screen 900 of the printer displayed on the operation display unit 306 as shown in FIG. 9, or the elapse of a predetermined time since the start of advertising the service. In addition, the trigger may be other matters such as an input of a providing termination instruction of the service, power-off or transition to a sleep state (an instruction to transition to the sleep state or a transition to the sleep state due to a time elapse) of the printer 100, and a process for invalidating another wireless LAN function. When a trigger for terminating advertising the service is detected (YES in step S403), the CPU 301 performs a process for terminating advertising the service (step S404). For example, the CPU 301 controls the communication unit 308 to stop transmitting the publish message, and discard data held in the buffer in the communication unit 308 as needed. In this way, by terminating the processing shown in FIG. 4 in response to a predetermined operation performed by the user, it can be prevented that service information is advertised a case in which the service is not available, and that unnecessary communication occurs.

While continuing to advertise the service, the CPU 301 controls the communication unit 308 to wait for communication from another NAN apparatus such as the user terminal 101. When the communication unit 308 receives data from the other NAN apparatus, it informs the CPU 301 of the received data. Then, the CPU 301 performs processing corresponding to the data it was informed of.

The CPU 301 determines whether a follow-up message including a service list request is received from the user terminal 101 (step S405). FIG. 7 shows an example 700 of the data in a follow-up message including a service list request. As shown in data 701 in FIG. 7, this follow-up message stores the address "01-23-45-67-89 XX" of the user terminal in the TA, and stores information "data type="service list request"" is stored in the service info. In step S405, the CPU 301 can determine whether a follow-up message in which "data type="service list request"" is designated in the service info is received.

If the CPU 301 determines that a follow-up message including a service list request is not received (NO in step S405), the process advances to step S407. On the other hand, if the CPU 301 determines that a follow-up message including a service list request is received (YES in step S405), it transmits a follow-up message including a service list to the user terminal 101 (step S406). A service list is a list identifying a service providable by the printer 100 to the user terminal 101, and it can be, for example, a list of service names separated by commas, such as "print service, scan service". An example of data to be transmitted when a service list is included in a follow-up message will be described with reference to FIG. 8. Table 800 shows data included in each follow-up message transmitted from each of four printers, in which one row corresponds to data transmitted from one printer. Note that Table 800 can be an aggregation of data obtained from four follow-up messages received from the four printers respectively by the user terminal. For example, data 801 indicates that the printer with the transmitter address (TA) "01-23-45-67-89 AA" has transmitted a follow-up message. In addition, it also indicates that the follow-up message includes information of "data type="service list response"" and "service list="print service, scan service"" as the service info. That is, when a service list is included in a follow-up message, data to be transmitted can be information of the data type indicating that the message is a service list response, and information for identifying a providable service. Owing to these pieces of data, the user terminal that has received the follow-up message can recognize that the printer can provide the "print service" and "scan service". Since the user terminal 101 is provided with the service list, when the user terminal 101 wants to use a plurality of services provided by the printer 100, it does not need to search for a printer for each service, resulting in improvement in user's convenience.

Note that the contents of a service list can be changed in accordance with the situation (for example, the state and/or setting value of the printer 100). For example, when the printer 100 cannot execute a print service due to a factor such as running out of ink and paper jam, it can exclude a print service from a service list to be transmitted to the user terminal 101, or add an error content notification service to the service list. In addition, the printer 100 can, for example, have a setting value indicating that it provides a print service to a specific apparatus alone, and when the TA of a message in F505 is different from the address of the specific apparatus, the printer 100 can perform a process such as the exclusion of a print service from a service list to be transmitted. In this way, the printer 100 can inform the user terminal 101 of a service available at that time in accordance with the situation.

The CPU 301 determines in step S407 whether a NAN data link start request is received from the user terminal 101. Note that for convenience, FIG. 4 shows a case in which a follow-up message including a service list request is determined to be received or not, and then a NAN data link start request is determined to be received or not. However, the present invention is not limited to this. For example, they may be determined simultaneously. That is, the CPU 301 may determine whether a signal received from the user terminal 101 is a follow-up message including a service list request, a NAN data link start request, or another message, at the same time. In addition, the determination in step S407 may be performed before that in step S405. If the signal received from the user terminal 101 is neither a follow-up message including a service list request (NO in step S405) nor a NAN data link start request (NO in step S407), the CPU 301 returns the process to step S403. On the other hand, if the signal received from the user terminal 101 is a NAN data link start request (YES in step S407), the CPU 301 controls the communication unit 308 to perform a NAN data link start process (step S408). Thus, data communication outside a DW period becomes available between the printer 100 and the user terminal 101. In the NAN data link start process, a process required for starting data communication, such as generation of an encryption key based on a pre-shared key, can be performed. Note that the detailed processing of the NAN data link start process will not be described herein because it is a conventional technique.

If the NAN data link is started between the printer 100 and the user terminal 101, the CPU 301 controls the communication unit 308 to wait for a reception of print data (step S409). If print data is received from the user terminal 101 via the communication unit 308, the CPU 301 controls the printing unit 305 to perform printing based on the received print data (step S410). If the CPU 301 determines that the printing is complete by monitoring the printing unit 305, for example, it controls the communication unit 308 to transmit a print completion notification to the user terminal 101 (step S411). When a sequence of the processes related to the print service is complete, the CPU 301 controls the communication unit 308 to perform a NAN data link termination process (step S412). Accordingly, the data communication outside a DW period is terminated between the printer 100 and the user terminal 101. Note that a print service using a NAN data link is performed in this processing example, however, any other service may be performed. In addition, a plurality of services may be sequentially performed. For example, when a print service is performed following to a scan service, copying a document, that is, a copy service can be performed. In this case, after completing the communication for one service, the CPU 301 may not terminate the NAN data link. For example, when a plurality of services are requested to be performed from the user terminal 101, the CPU 301 may control the communication 308 to perform the NAN data link termination process after the completion of the processes related to a sequence of services.

Note that the printer 100 can continue to advertise the service even during the communication in the NAN data link. In addition, the printer 100 can continue to advertise the service even after the termination of the NAN data link, and wait for next communication from the user terminal 101 or other apparatus 102.

Figure 5:
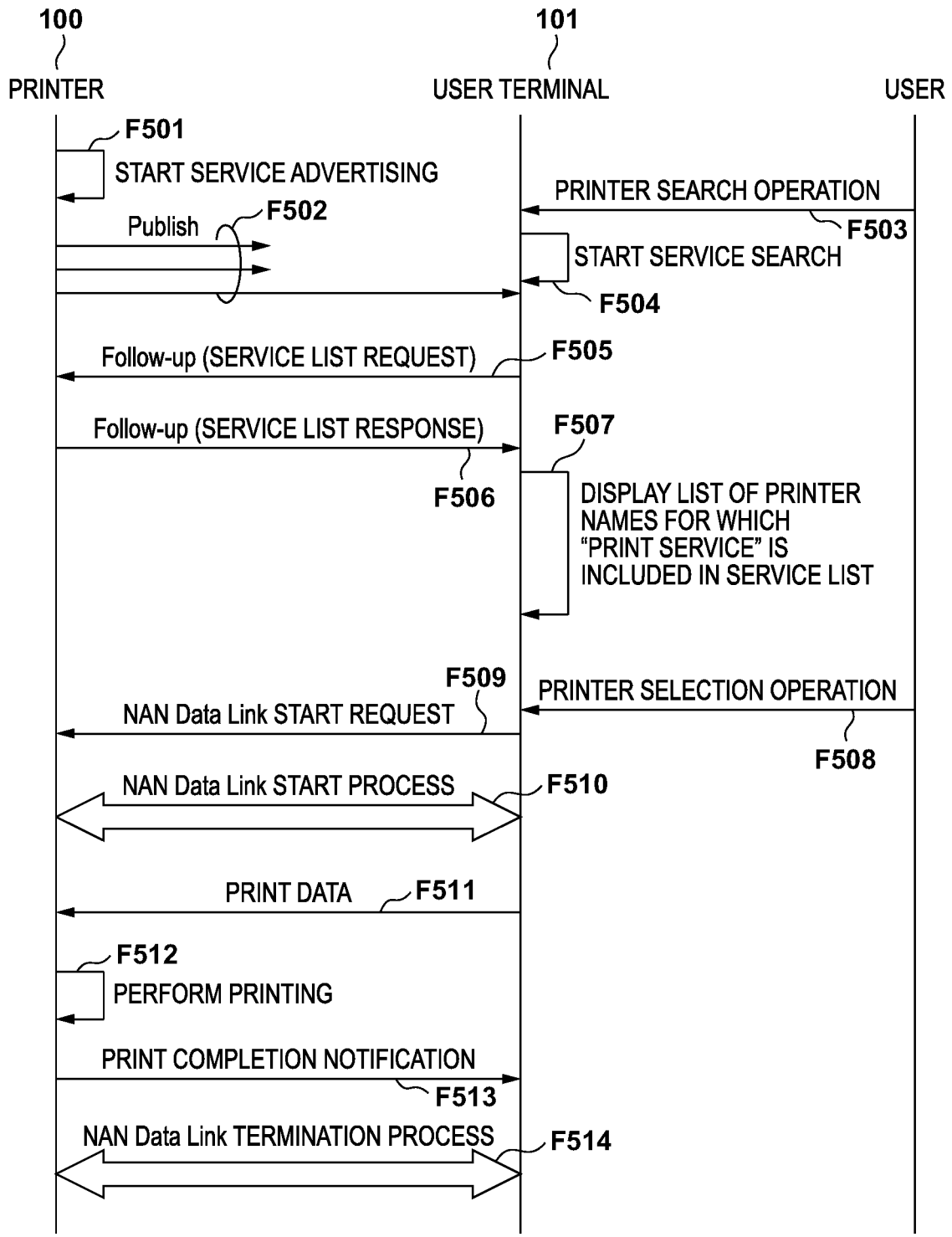
FIG. 5 is a sequence chart showing the first example of the procedure of processing performed in the wireless communication system.

An example of the procedure of processing performed in the wireless communication system will be described with reference to FIG. 5. It is assumed that at the time of the start of the processing in FIG. 5, the printer 100 and the user terminal 101 belong to the same NAN cluster so that they can transmit/receive respective messages, such as a publish message, a subscribe message, and a follow-up message, during a DW period.

First, the printer 100 starts to advertise a service (F501), and transmits a publish message including the service ID generated from the character string representing the apparatus base on the manufacturer name and apparatus type (F502). This publish message is transmitted without designating a destination, so that another apparatus joining the NAN cluster 110 can receive the publish message and recognize the service providable by the printer 100. Then, the user performs a printer search operation on the user terminal 101 (F503). The user terminal 101 can determine that the printer search operation is performed, for example, in response to tapping on a print button 1012 for printing an image content 1011 on an application screen 1010, as shown in FIG. 10A, running on the user terminal 101. Note that the present invention is not limited to this, and the user terminal 101 may detect a printer search operation by another arrangement. For example, the user terminal 101 may determine that the printer search operation is performed in response to tapping on a printer search button in an application having the printer search button. The user terminal 101 starts to receive a publish message in response to the printer search operation (F504). Accordingly, the user terminal 101 receives the publish message (F502) sent from the printer 100.

The user terminal 101 confirms that the service ID included in the publish message received from the printer 100 matches with the service ID that the user terminal 101 is searching for. Then, the user terminal 101 saves, as printer information, the value of the printer name included in the publish message and set in the service info as shown in FIG. 6. Here, it is assumed that the user terminal 101 matches the service IDs of publish messages received from the four printers, as shown in FIG. 6, with the value of the service ID that the user terminal 101 is searching for, obtains the printer names from the service info fields of those messages, and saves them. Furthermore, the user terminal 101 transmits, to the printer 100, a follow-up message including a service list request as shown in FIG. 7 (F505) in order to find one or more services provided by the printer 100. In response to receiving the follow-up message including the service list request from the user terminal 101, the printer 100 transmits a follow-up message including a service list to the user terminal 101 (F506). Accordingly, the user terminal 101 can obtain the list of the services providable by the each printer, whose printer information has been saved, as shown in FIG. 8. Note that the processes in F505 and F506 do not necessarily have to be performed. For example, since the user terminal 101 records the connection history and service execution history, when it has a history indicating that it has connected to the printer 100 or that it has been provided with a service from the printer 100 in a predetermined period, the message of F505 may not be transmitted. In addition, if it is determined from the publish message of F502 that the printer 100 can provide a desired message, for example, the user terminal 101 may not transmit the message of F505. The printer 100 may not transmit the message of F506 if it does not receive the message of F505.

When the follow-up message is received from the printer 100, the user terminal 101 analyses the value of the service info of the follow-up message, and obtains the service list about the service providable by the printer 100. If "print service" is included in the service list, the user terminal 101 reads out the printer name of the printer 100 from the saved printer information. Then, the user terminal 101 adds the readout printer name to a printer selection screen 1020, and displays the list of the printers whose service list includes "print service" (F507), as shown in FIG. 10B. Note that FIG. 10B shows a case in which the user terminal 101 has received the service list shown in FIG. 8. In FIG. 8, the printer with the TA being "01-23-45-67-89 AA", the printer with the TA being "01-23-45-67-89-BB", and the printer with the TA being "01-23-45-67-89 DD" have the service lists including "print service". Therefore, the user terminal 101 displays the list of printer names "5th-floor office north-side printer", "5th-floor office south-side printer", and "5th-floor office west-side printer" corresponding to the TAs from the printer information saved as shown in FIG. 6. Since "5th-floor office east-side printer" includes "scan service" but not "print service" in the service list, it is not displayed in the list.

Then, the user performs a printer selection operation on the user terminal 101 (F508). Upon detecting tapping on a button 1021 with the printer name on the printer selection screen 1020 of the application running on the user terminal 101, as shown in FIG. 10B, the user terminal 101 can determine that the printer selection operation is performed. Note that the printer screen and its arrangement are merely examples, and the printer selection operation may be determined by another arrangement. In response to this printer election operation, the user terminal 101 transmits a NAN data link start request to the printer 100 (F509). This NAN data link start request causes a NAN data link start process to be performed between the printer 100 and the user terminal 101 (F510). If a NAN data link is established by the NAN data link start process, data communication outside a DW period using this NAN data link becomes available. Here, in the data communication outside a DW period, since data to be transmitted/received can be encrypted using an encryption key generated based on a pre-shared key, secure communication can be performed. The user terminal 101 transmits print data to the printer 100 using the established NAN data link (F511). If the print data is received, the printer 100 performs printing based on the print data (F512). While the printer 100 is performing the printing, the user terminal 101 can display, for example, a printing screen 1030 as shown in FIG. 10C. If the printing is complete, the printer 100 transmits a print completion notification to the user terminal 101 (F513). If the print completion notification is received, the user terminal 101 can display a print completion screen 1040 as shown in FIG. 10D. After that, a NAN data link termination process is performed between the printer 100 and the user terminal 101 (F514), so that the connection for data communication outside a DW period can be disconnected.

If required, the data communication between the printer 100 and the user terminal 101 may be continued without performing the NAN data link termination process at this time. For example, the user terminal 101 may try to print other image content sequentially. In addition, during performing the communication by the NAN data link and after the disconnection of the connection, the printer 100 may continue to advertise the service and the user terminal 101 may search for another printer and another service.

As described above, in a period in which a NAN data link is not established, the printer 100 advertises a service only using intermittent wireless communication in the DW periods. On the other hand, the printer 100 establishes a NAN data link outside the DW period to perform data communication for performing a service. That is, the printer 100 uses communication in a DW period of NAN with relatively low power consumption to advertise a providable service, and uses data communication outside a DW period with relatively high power consumption to perform high-speed communication for performing a service, such as reception of print data. At this time, another wireless communication method, such as BLE, that cannot use the common communication circuit and the like is not used. Therefore, the printer 100 of this processing example can establish a wireless connection with a communication partner apparatus (for example, the user terminal 101) while suppressing the apparatus cost with low power consumption, and after that, it can establish a connection for data communication to transfer data.

In the example described above, in response to tapping on the print button 1012 on the application screen 1010 as shown in FIG. 10A, the user terminal 101 starts to search for a service using NAN. However, searching for a service may be started at an arbitrary timing of the user terminal 101 and during displaying an arbitrary screen. For example, searching for a service may be performed after a user has selected a specific apparatus such as the printer 100 and a screen for selecting a function to be performed by the specific apparatus is displayed. In this case, on the condition that the user terminal 101 has received a publish message (the manufacturer name and apparatus type) corresponding to the specific apparatus in F502, it requests a service list in F505. Then, the user terminal 101 displays the service included in the service list received in F506. For example, the user terminal 101 selectably displays the service actually included in the service list among a plurality of services that can be included as available service in the service list, on the screen for selecting a function to be performed by the printer 100.

Processing Example 2

In this processing example, after the printer 100 and the user terminal 101 establish a NAN data link, they transmit/receive the setting information of a wireless LAN connection other than NAN, and establish the wireless LAN communication other than NAN based on the setting information to switch the connection. Note that herein, switching the connection after establishing a NAN data link and establishing a wireless LAN connection other than NAN is called handover. Print data is transmitted/received using the handed-over destination wireless LAN connection to perform a print service. The details of the processing will be described below with reference to FIGS. 11 and 12.

Figure 11:
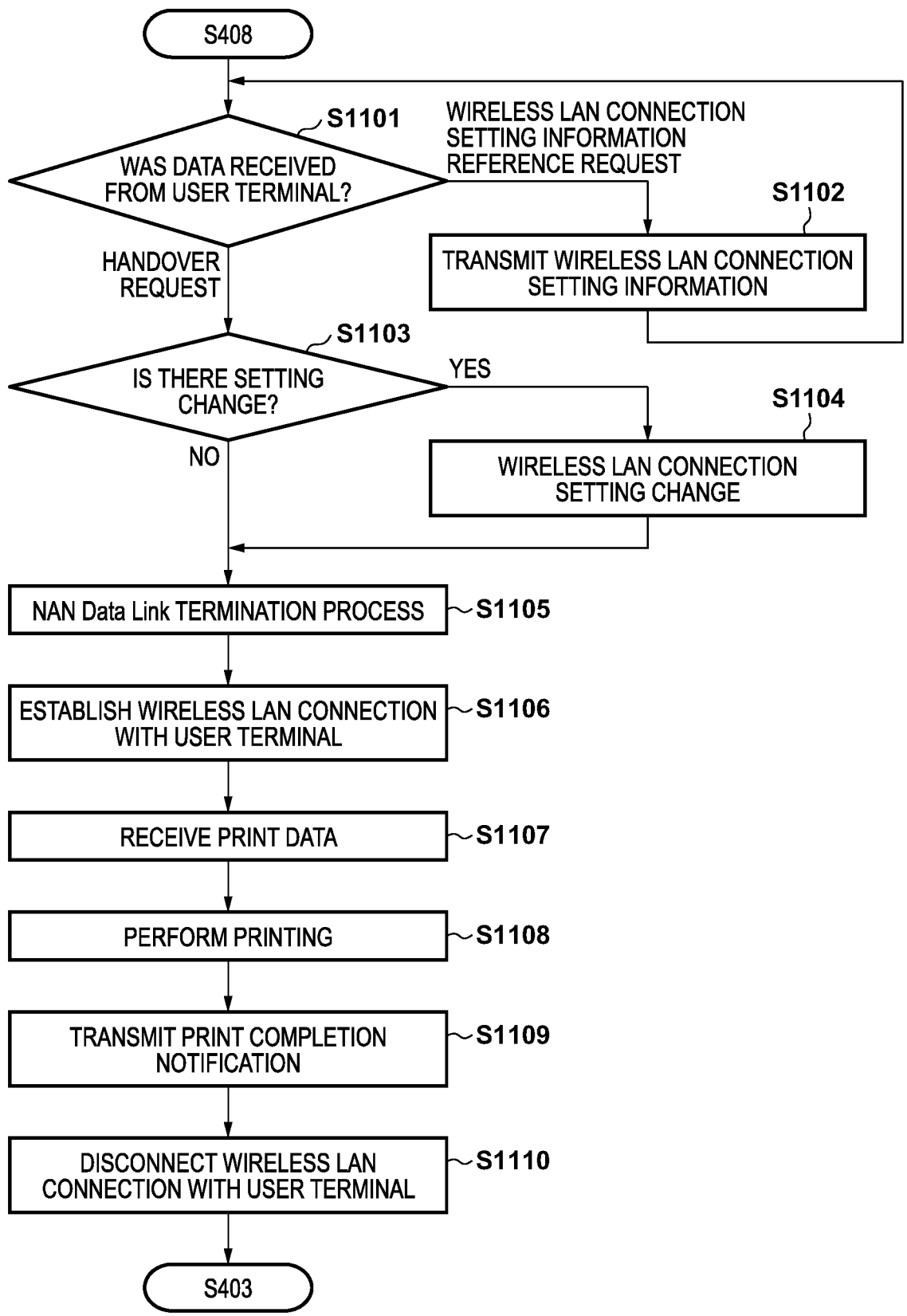
FIG. 11 is a flowchart showing the second example of the procedure of processing performed by the printer.

The procedure of processing of the printer 100 is described with reference to FIG. 11. Since this processing is the same as processing example 1 in the processing until a NAN data link start process is performed in FIG. 4, the illustration and description thereof will be omitted. The CPU 301 controls the communication unit 308 to perform a NAN data link start process (step S408), thereby establishing a secure connection between the printer 100 and the user terminal 101. Furthermore, the CPU 301 controls the communication unit 308 to wait for communication from the user terminal 101. When data is received from the user terminal 101, the communication unit 308 notifies the CPU 301 of the received data. The CPU 301 performs a process corresponding to the notified data (step S1101).

When the data received from the user terminal 101 is a reference request of the wireless LAN connection setting information, the CPU 301 reads out the wireless LAN connection setting information of the printer 100 at that time from the memory 304. Then, the CPU 301 controls the communication unit 308 to transmit the readout wireless LAN connection setting information to the user terminal 101 (step S1102). Here, the wireless LAN connection setting information to be transmitted to the user terminal 101 can include, for example, a flag indicating the valid/invalid state of each of various communication functions of the printer 100. In addition, this setting information can include the SSID, BSSID, and password information of the access point to which the printer 100 is connecting, the SSID, BSSID, and password information of the printer 100 used when it performs P2P wireless LAN communication with another apparatus. Note that these are merely examples, and the setting information may include other data required to handover from the NAN to another wireless LAN connection.

A case in which the data received by the printer 100 from the user terminal 101 is a handover request (with setting change) (YES in step S1103) will be described next. The handover request (with setting change) received from the user terminal 101 is a handover request with a setting change request including wireless LAN connection setting change information. This wireless LAN connection setting change information can be a request for changing the valid/invalid state of each of the various communication functions of the printer 100, such as "validate the P2P communication function". Note that this setting change information is merely an example, and the wireless LAN connection setting change information may include access point information such as "SSID, BSSID, and password information of the access point to which the printer 100 should connect". In response to the wireless LAN connection setting change information, the CPU 301 controls the communication unit 308 to change the wireless LAN connection setting (step S1104). Furthermore, the CPU 301 rewrites the wireless LAN connection setting information of the printer 100 stored in the memory 304 in accordance with the change of the wireless LAN connection setting. The processing after this is the same as the case in which the data received from the user terminal 101 is a handover request (without setting change) (NO in step S1103), which will be described later.

A case in which the data received from the user terminal 101 is a handover request (without setting change) (NO in step S1103) will be described. In this case, the CPU 301 controls the communication unit 308 to perform a NAN data link termination process (S1105). At this time, the user terminal 101 tries handover using the wireless LAN connection setting information. In response to this, the CPU 301 of the printer 100 controls the communication unit 308 to establish a wireless LAN connection other than NAN with the user terminal 101 (step S1106). Then, the CPU 301 controls the communication unit 308 to receive print data using the wireless LAN connection other than NAN (step S1107). When the print data is received, the CPU 301 controls the printing unit 305 to perform printing based on the received print data (step S1108). After completion of the printing, the CPU 301 controls the communication unit 308 to transmit a print completion notification to the user terminal 101 (step S1109). When a sequence of the processes related to the print service is complete, the CPU 301 controls the communication unit 308 to disconnect the wireless LAN communication with the user terminal 101 (step S1110), and returns the process to step S403 in FIG. 4. Note that a case in which a print service is performed using a wireless LAN communication other than NAN is described in this processing example, but any other arbitrary service may be performed. In addition, a plurality of services may be sequentially performed.

Note that the printer 100 can continue to advertise the service during performing wireless LAN communication other than NAN. In addition, the printer 100 can continue to advertise the service after the disconnection of the wireless LAN connection, and wait for next communication from the user terminal 101 or the other apparatus 102.

The procedure of processing performed in the wireless communication system will be described next with reference to FIG. 12. Note that since this processing is the same as the processing shown in FIG. 5 in the procedure until a NAN data link start process is performed between the printer 100 and the user terminal 101 (F510) and a NAN data link is established, the illustration and description thereof will be omitted.

When a NAN data link is established, the user terminal 101 uses the NAN data link to transmit to the printer 100 a reference request of the wireless LAN connection setting information (F1201). In response to the reference request of the setting information of the wireless LAN connection, the printer 100 uses the NAN data link to transmit the wireless LAN connection setting information of the printer 100 to the user terminal 101 (F1202). When the wireless LAN connection setting information of the printer 100 is received, the user terminal 101 determines whether a setting change of the printer 100 is required to perform a wireless LAN connection (F1203), and transmits a message corresponding to the determination result to the printer 100 (F1204). When the setting change of the printer 100 is determined to be required, the user terminal 101 transmits "handover request (with setting change)" to the printer 100 by using the NAN data link. On the other hand, when the setting change of the printer 100 is determined to be unrequired, the user terminal 101 transmits "handover request (without setting change)" to the printer 100 by using the NAN data link. Then, a NAN data link termination process is performed between the printer 100 and the user terminal 101, so that the connection outside a DW period is disconnected (F1205). Note that when a handover request (with setting change) is received, the printer 100 changes the wireless LAN connection setting in accordance with the wireless LAN connection setting change information included in the handover request (with setting change) (F1206). This enables the user terminal 101 to decide the appropriate wireless LAN connection setting information in accordance with the nearby circumstance, and establish the connection with the printer 100. Note that when a handover request (without setting change) is received, the printer 100 does not change the wireless LAN connection setting. According to this, since the user terminal 101 accepts the setting information of the printer 100, the setting load on the printer 100 can be suppressed. At this stage, the printer 100 and the user terminal 101 can establish a connection using a wireless LAN communication method other than NAN. Note that in some cases, the printer 100 may deny a setting change request (handover request (with setting change)). That is, for example, while the printer 100 is performing wireless LAN communication with other apparatus, it may not accept a setting change request.

Subsequently, a process for connecting a wireless LAN other than NAN is performed between the printer 100 and the user terminal 101 (F1207), and the wireless LAN connection other than NAN is established. The user terminal 101 uses this wireless LAN connection to transmit print data to the printer 100 (F1208). When the print data is received, the printer 100 performs printing based on the print data (F1209). While the printer 100 is performing the printing, the user terminal 101 can display the printing screen 1030 as shown in FIG. 10C. When the printing is complete, the printer 100 transmits a print completion notification to the user terminal 101 (F1210). In response to receiving the print completion notification, the user terminal 101 can display the print completion screen 1040 as shown in FIG. 10D.

After that, a process for disconnecting the wireless LAN other than NAN is performed between the printer 100 and the user terminal 101 (F1211), so that the wireless LAN connection other than NAN can be disconnected.

The data communication between the printer 100 and the user terminal 101 may be continued without performing the process for disconnecting the established wireless LAN connection at this time, as needed. For example, the user terminal 101 may try to print other image content sequentially. In addition, during performing the communication by the wireless LAN connection other than NAN and after the disconnection of the connection, the printer 100 may continue to advertise the service and the user terminal 101 may search for another printer and another service.

In this way, the printer 100 advertises a service only using intermittent wireless communication in the DW periods based on NAN. Then, the wireless LAN connection setting information is transmitted/received using secure data communication in a NAN data link. The setting of a wireless LAN connection can be securely performed. Furthermore, based on the transmitted/received wireless LAN connection setting information, handover to a wireless LAN communication method other than NAN is performed, so that data to be used in a service is communicated using the handed-over wireless LAN communication method. The wireless LAN communication method other than NAN can be a wireless LAN communication method that complies with the IEEE802.11 standard series and can share at least a part of the communication circuit with NAN. In the wireless LAN communication method complying with the IEEE802.11 standard series, communication faster than NAN is possible.

With the arrangement described above, in a sequence of communication processes, other wireless communication methods such as BLE that cannot share the communication circuit and the like are not used. Accordingly, the printer 100 can establish a wireless connection with a communication partner apparatus (for example, the user terminal 101) while suppressing the apparatus cost with low power consumption, and then it can establish a connection for data communication to securely transfer data. In addition, switching the connection to another communication method enables transfer of a large amount of data.

Note that whether to transmit print data using NAN as in processing example 1 or to transmit print data by changing NAN to a faster communication method as in processing example 2 may be determined depending on various conditions. For example, when the capacity of print data is larger than a predetermined capacity, the print data is transmitted using NAN to reduce the power consumption. Along with this, when the capacity of print data is not larger than the predetermined capacity, the print data may be transmitted using a faster communication method (for example, a wireless LAN communication method complying with the IEEE802.11 standard series) to achieve high-speed data transfer.

Note that in processing example 2, when a handover request (with setting change) is received from the user terminal 101, the printer 100 may save the wireless LAN connection setting information at that time as "pre-change setting information" in the memory 304, and then change the wireless LAN connection setting. In this case, after terminating the wireless LAN communication with the user terminal 101 using the handed-over connection, the printer 100 can read out the "pre-change setting information" from the memory 304 and return the wireless LAN connection setting information to the pre-change one. Accordingly, for example, it can be prevented that the setting information set by the user is changed by another apparatus and fixed at the value not intended by the user. For example, assume a case in which when the P2P communication function of the printer 100 is invalid and the printer 100 is connected to an external access point, the connection with the access point is disconnected and "validate the P2P communication function" is performed as a setting change. In this case, the information indicating that "the P2P communication function is invalid", and the SSID and password of the access point are saved as the "pre-change setting information" in the memory 304. After the wireless LAN communication with the user terminal 101 is terminated, a connection with the access point is established using the SSID and the password.

In processing examples 1 and 2, examples of a case in which print data and wireless LAN connection setting information are transmitted/received in a NAN data link have been described. However, any other data and information may be transmitted/received. For example, the printer 100 can transmit audio data to the user terminal 101 in a NAN data link. Accordingly, even when the printer 100 has no audio output unit such as a speaker, information such as the audio guidance of the printer operation can be transmitted to the user terminal 101 and output from the speaker of the user terminal 101. In addition, for example, the registration information of a cloud service can be transmitted from the printer 100 to the user terminal 101, or vice versa, in a NAN data link. Accordingly, when one of the printer 100 and the user terminal 101 has been registered in the cloud service, the information is transmitted to the other, thereby enabling access to the cloud service from the both apparatuses. Furthermore, the printer 100 may obtain the information of the other apparatus 102 or an apparatus not belonging to the NAN cluster 110, and transmit the obtained information to the user terminal 101 in a NAN data link. For example, when the printer 100 cannot perform printing due to running out of ink, it can obtain the information of another nearby printer and transmit it to the user terminal 101, so that a print service can be performed using the other printer. In addition, the printer 100 can transmit information such as video data, image data, and operating manual data to the user terminal 101 via a NAN data link. In this case, displaying the information received by the user terminal 101 can assist a user in operating the printer 100. Furthermore, the URL of the user support page of the printer 100 and that of the download page of the application corresponding to the printer 100 and running on the user terminal may be transmitted using a NAN data link. This can assist a user in operating the printer 100.

In processing example 2, for example, the wireless LAN connection setting information used in a handover is transmitted/received in a NAN data link, but at least a part of the wireless LAN connection setting information may be included and transmitted/received in another message. That is, at least a part of the wireless LAN connection setting information can be transmitted in, for example, a publish message, a subscribe message, or a follow-up message. In an example, it may be arranged such that information such as the password with high confidentiality is securely transmitted/received in a NAN data link, and remaining information such as the SSID and BSSID is transmitted/received in a follow-up message in advance. Note that in a case in which at least a part of data, which is described to be transmitted/received in a NAN data link, is transmitted/received in the other message, the data to be transmitted/received in the other message is not limited to wireless LAN connection setting information. For example, the above-described data that can be transmitted/received in a NAN data link (for example, audio data and cloud service registration information) may be included and transmitted/received in a follow-up message. At this time, the data that cannot be stored in one follow-up message may be divided into several follow-up messages and transmitted/received. Note that the above-described communication using a NAN data link is not limited to that as long as the communication is based on NAN. That is, since it is sufficient that the communication circuit used when discovering a service by NAN is also used when communication for the service is performed, the communication for performing the service may be performed using communication based on NAN other than a NAN data link.

Although each processing described above has been described to be performed by the CPU 301 executing the program stored in a storage device such as the ROM 302, the present invention is not limited to this. For example, a part or all of the processing described above may be performed by dedicated hardware. In addition, a part or all of each of the processing examples described above may be performed under control of a processor or the like included in the communication unit 308.

According to the present invention, a wireless connection between apparatuses can be established while suppressing the apparatus cost with low power consumption.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015506, filed Jan. 31, 2018 which is hereby incorporated by reference herein in its entirety.

What is claimed is:

1. A communication apparatus that performs wireless communication in accordance with a Neighbor Awareness Network (NAN), comprising:
   at least one processor, wherein the at least one processor performs
   advertising Publish In NAN including identification information of the communication apparatus in response to a start of the wireless communication,
   receiving a response from a terminal apparatus with respect to the Publish, and
   transmitting Follow-up in NAN including service information indicating a service providable by the communication apparatus, to the terminal apparatus in response to the received response.

2. The apparatus according to claim 1, wherein the at least one processor performs the wireless communication in accordance with NAN to communicate data for the service with the terminal apparatus, in response to a request transmitted from the terminal apparatus which has detected the service by the Follow-up.

3. The apparatus according to claim 2, wherein
   the communication apparatus can perform other wireless communication which shares at least a part of the communication circuit and has power consumption higher than the wireless communication in accordance with NAN, and
   the at least one processor performs communication for communicating data for the other wireless communication with the terminal apparatus, using the wireless communication in accordance with NAN, and
   the at least one processor executes communication of data used in the service, using the other wireless communication which is established with the terminal apparatus based on the communicated data.

4. The apparatus according to claim 2, wherein the data is communicated by a NAN data link performed in a period different from a discovery window (DW) period.

5. The apparatus according to claim 3, wherein the at least one processor performs communication of setting information for a connection, in which the other wireless communication is used, by using the wireless communication, in accordance with NAN.

6. The apparatus according to claim 5, wherein when a setting change request is received from the terminal apparatus in the communication of the setting information, the at least one processor changes setting of the connection in which the other wireless communication is used.

7. The apparatus according to claim 6, wherein
   the at least one processor saves the pre-change setting of the connection, in which the other wireless communication is used, in a memory, and
   after termination of communication with the terminal apparatus using the other wireless communication, the at least one processor returns the setting of the connection, in which the other wireless communication is used, to the pre-change setting saved in the memory.

8. The apparatus according to claim 3, wherein in the other wireless communication, one of the communication apparatus and the terminal apparatus operates as an access point of a wireless LAN, and the other operates as a station of the wireless LAN.

9. The apparatus according to claim 3, wherein in the other wireless communication, both of the communication apparatus and the terminal apparatus operate as stations of a wireless LAN and connect to an external access point.

10. The apparatus according to claim 3, wherein in the other wireless communication, the communication apparatus and the terminal apparatus perform communication based on a Wi-Fi Direct standard.

11. The apparatus according to claim 1, wherein each of the Publish and the Follow-up is communication performed in a discovery window (DW) period of the NAN.

12. The apparatus according to claim 11, wherein the identification information is stored and transmitted in a service ID field included in a service discovery frame (SDF) of the NAN.

13. The apparatus according to claim 11, wherein in the transmitting, the service information indicating a service providable by the communication apparatus is stored and transmitted in a service info field included in a service discovery frame (SDF) of the NAN.

14. The apparatus according to claim 1, wherein a service indicated by the service information transmitted in the transmitting is changed in accordance with a state and/or a setting value of the communication apparatus.

15. The apparatus according to claim 1, wherein the identification information comprises a value corresponding to information representing the communication apparatus and being based on a manufacturer name and/or an apparatus type.

16. The apparatus according to claim 1, wherein the at least one processor starts the wireless communication in accordance with NAN in response to that the communication apparatus accepts a predetermined operation by a user.

17. The apparatus according to claim 16, wherein the predetermined operation includes validation of advertising the Publish, and/or an input of a providing start instruction of the service, and/or power-on of the communication apparatus, and/or recovery of the communication apparatus from a sleep state, and/or validation of a communication function of the communication apparatus different from the wireless communication in accordance with NAN.

18. The apparatus according to claim 16, wherein the at least one processor terminates advertising the Publish using the wireless communication in accordance with NAN, in response to that the communication apparatus accepts a second predetermined operation.

19. The apparatus according to claim 18, wherein the second predetermined operation includes invalidation of advertising the Publish, and/or an input of a providing termination instruction of the service, and/or power-off of the communication apparatus, and/or an transition instruction of the communication apparatus to a sleep state, and/or invalidation of the communication function of the communication apparatus different from the wireless communication in accordance with NAN.

20. The apparatus according to claim 1, wherein the at least one processor terminates advertising the Publish using the wireless communication in accordance with NAN, in response to an elapse of a predetermined time since the start of advertising the Publish.

21. The apparatus according to claim 1, wherein the communication apparatus comprises a printer, and the service includes a print service.

22. A communication method performed by a communication apparatus that performs wireless communication in accordance with a Neighbor Awareness Network (NAN), comprising:
   advertising Publish In NAN including identification information of the communication apparatus in response to a start of the wireless communication, receiving a response from a terminal apparatus with respect to the Publish, and transmitting Follow-up in NAN including service information indicating a service providable by the communication apparatus, to the terminal apparatus in response to the received response.

23. A communication method executed by a terminal apparatus and a communication apparatus that performs wireless communication with the terminal apparatus in accordance with a Neighbor Awareness Network (NAN), comprising:

advertising, by the communication apparatus, Publish In NAN including identification information of the communication apparatus in response to a start of the wireless communication, transmitting, by the terminal apparatus, a response from a terminal apparatus with respect to the Publish, and transmitting, by the communication apparatus, Follow-up in NAN including service information indicating a service providable by the communication apparatus, to the terminal apparatus in response to the received response.

24. The communication method according to claim 23, further comprising, confirming, by the terminal apparatus, that the identification information included in the Publish advertised from the communication apparatus matches predetermined identification information that the terminal apparatus is searching for, wherein the response is transmitted by the terminal apparatus, based on the confirming.

25. The communication method according to claim 23, further comprising displaying, by the terminal apparatus, information of the communication apparatus based on that the service information indicating a predetermined service is transmitted in the transmitting, wherein data for the service is communicated in accordance with NAN between the terminal apparatus and the communication apparatus, based on that the communication apparatus is selected after the displaying.

26. The communication method according to claim 23, further comprising determining, by the terminal apparatus, whether to request the advertising of the Publish, based on a history of connection with the communication apparatus or a history of execution of the service by the communication apparatus, wherein the request is transmitted as the response with respect to the Publish.

* * * * *